(12) United States Patent
Porter

(10) Patent No.: US 11,458,919 B2
(45) Date of Patent: Oct. 4, 2022

(54) VEHICULAR DIVIDER ASSEMBLY

(71) Applicant: Billy Porter, Cibolo, TX (US)

(72) Inventor: Billy Porter, Cibolo, TX (US)

( * ) Notice: Subject to any disclaimer, the term of this patent is extended or adjusted under 35 U.S.C. 154(b) by 97 days.

(21) Appl. No.: 17/141,458

(22) Filed: Jan. 5, 2021

(65) Prior Publication Data

US 2022/0212619 A1 Jul. 7, 2022

(51) Int. Cl.
*B60R 21/02* (2006.01)

(52) U.S. Cl.
CPC .................................. *B60R 21/026* (2013.01)

(58) Field of Classification Search
CPC ............................. B60R 21/026; B60R 21/06
See application file for complete search history.

(56) References Cited

U.S. PATENT DOCUMENTS

| | | | |
|---|---|---|---|
| 2,644,948 A * | 7/1953 | Gutmann | A47G 9/086 |
| | | | 5/413 R |
| 4,621,856 A | 11/1986 | McKenzie | |
| 4,938,518 A | 7/1990 | Willemsen | |
| 4,960,293 A * | 10/1990 | Bottinick | B60R 21/026 |
| | | | 280/749 |
| 5,238,282 A | 8/1993 | Watson | |
| 5,536,057 A | 7/1996 | Stewart | |
| 6,086,128 A | 7/2000 | Whitehead | |
| 6,105,653 A | 8/2000 | Armstrong | |
| 7,669,907 B2 * | 3/2010 | Spater | B60R 21/06 |
| | | | 296/24.46 |
| D796,422 S | 9/2017 | Hodges | |
| 11,027,673 B1 * | 6/2021 | Abdelrahman | B60R 21/12 |
| 2003/0094826 A1 | 5/2003 | Thompson | |
| 2013/0020824 A1 * | 1/2013 | Tinterow | B60R 21/026 |
| | | | 29/428 |
| 2013/0257079 A1 * | 10/2013 | Donovan | B60R 21/026 |
| | | | 296/24.43 |
| 2019/0009653 A1 * | 1/2019 | Johnson | E06B 7/28 |
| 2021/0339696 A1 * | 11/2021 | Morales | B60R 21/12 |
| 2022/0097639 A1 * | 3/2022 | McClymont | B60R 21/026 |

FOREIGN PATENT DOCUMENTS

| | | | |
|---|---|---|---|
| DE | 202020102690 U1 * | 9/2020 | |
| EP | 3984832 A1 * | 4/2022 | |
| JP | H07285382 A * | 10/1995 | |
| KR | 200204844 Y1 * | 12/2000 | |
| KR | 101324948 B1 * | 12/2013 | |
| WO | WO-0050269 A1 * | 8/2000 | B60R 21/026 |
| WO | WO-2009151362 A1 * | 12/2009 | B60R 21/026 |

* cited by examiner

*Primary Examiner* — Paul N Dickson
*Assistant Examiner* — Kurtis Nielson

(57) ABSTRACT

A vehicular divider assembly includes a member that is positionable on a ceiling of a vehicle cabin. A divider is coupled to the member such that the divider extends between a forward compartment of the vehicle cabin and a rear compartment of the vehicle cabin. The divider is comprised of a fluid impermeable material to inhibit the transfer of microbes between the forward compartment and the rear compartment. A flap is integrated into the divider to facilitate air to move between the forward compartment and the rear compartment of the vehicle cabin. A pair of first mating members and a pair of second mating members is each coupled to the divider which can be secured to structural features of the vehicle cabin.

6 Claims, 4 Drawing Sheets

VEHICULAR DIVIDER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to divider devices and more particularly pertains to a new divider device for inhibiting the airborne transmission of infectious diseases in a vehicle. The divider includes a flap that can be opened to accommodate air vents of an air conditioning system of the vehicle.

(2) Description of Related Art Including Information Disclosed Under 37 CFR 1.97 and 1.98

The prior art relates to divider devices including a variety of enclosures that can be positioned in a vehicle cabin for defining a pair of fluidly discrete areas in the vehicle cabin. The prior art also discloses a variety of dividers that can be positioned in a vehicle cabin for dividing the vehicle cabin. In no instance does the prior art disclose a divider that has a flap that can be opened and closed and which can be positioned in a vehicle cabin.

BRIEF SUMMARY OF THE INVENTION

An embodiment of the disclosure meets the needs presented above by generally comprising a member that is positionable on a ceiling of a vehicle cabin. A divider is coupled to the member such that the divider extending between a forward compartment of the vehicle cabin and a rear compartment of the vehicle cabin. The divider is comprised of a fluid impermeable material to inhibit the transfer of microbes between the forward compartment and the rear compartment. A flap is integrated into the divider to facilitate air to move between the forward compartment and the rear compartment of the vehicle cabin. A pair of first mating members and a pair of second mating members is each coupled the divider which can be secured to structural features of the vehicle cabin.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
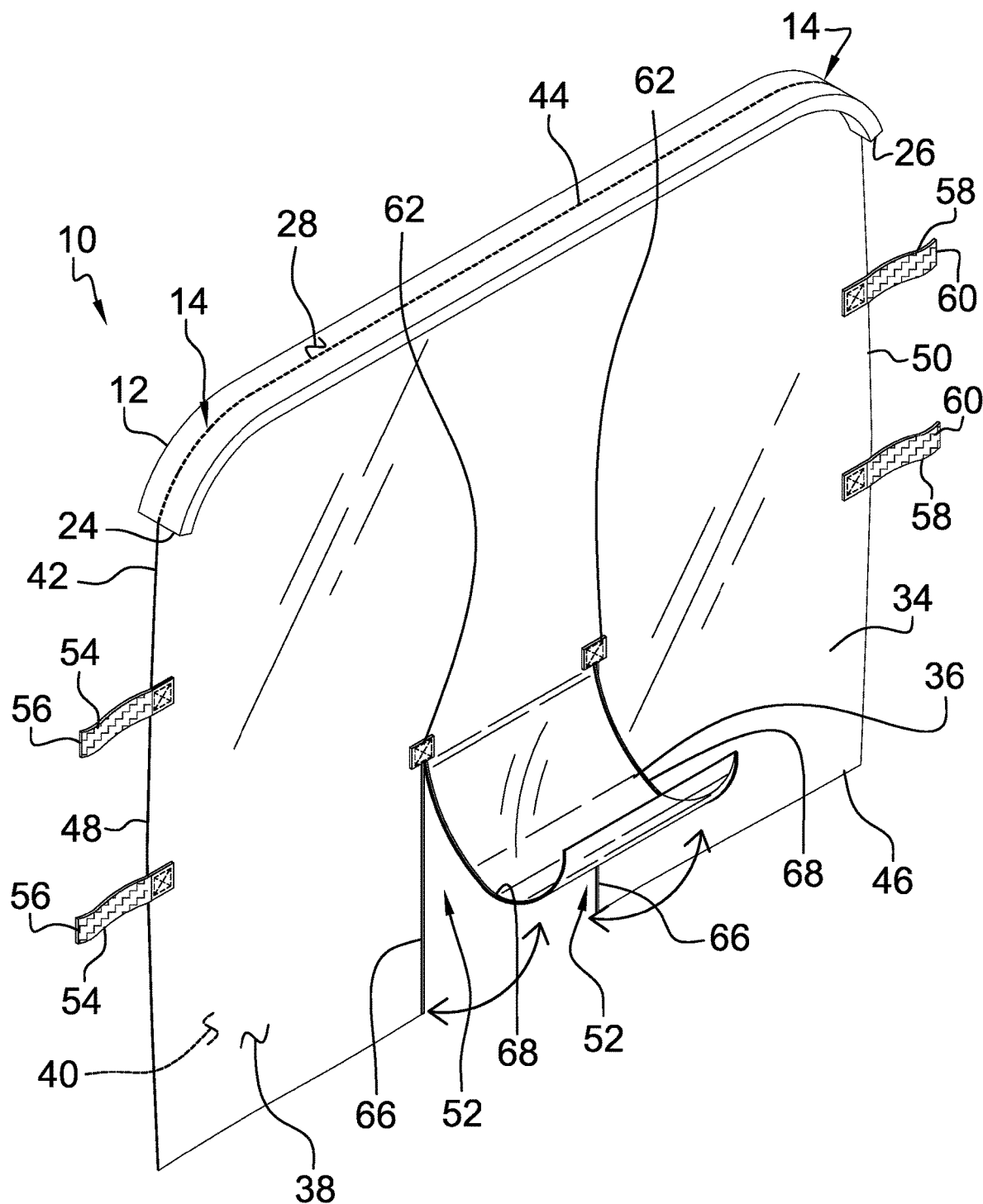
FIG. 1 is a perspective view of a vehicular divider assembly according to an embodiment of the disclosure.
Figure 2:
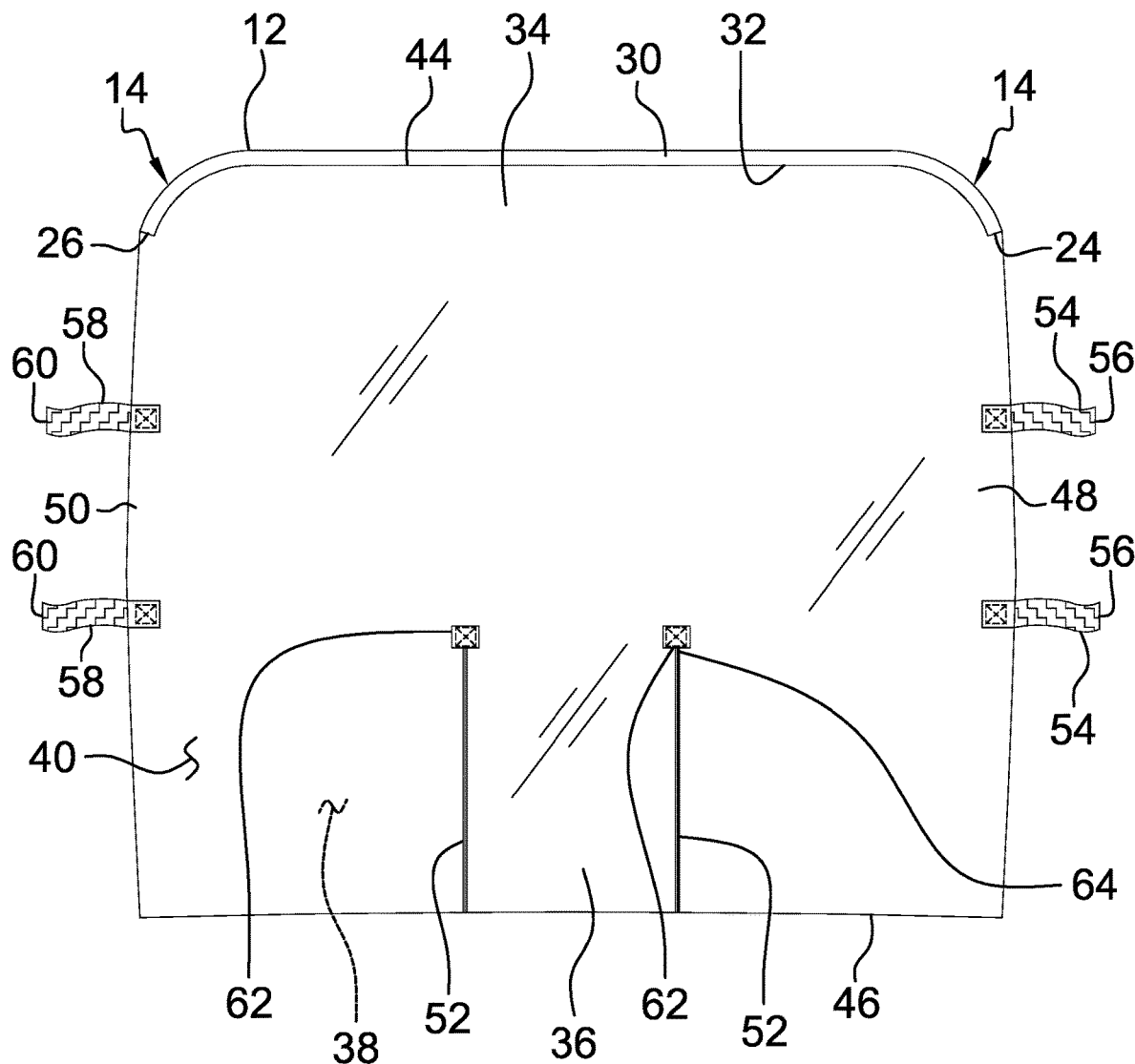
FIG. 2 is a front view of an embodiment of the disclosure.
Figure 3:
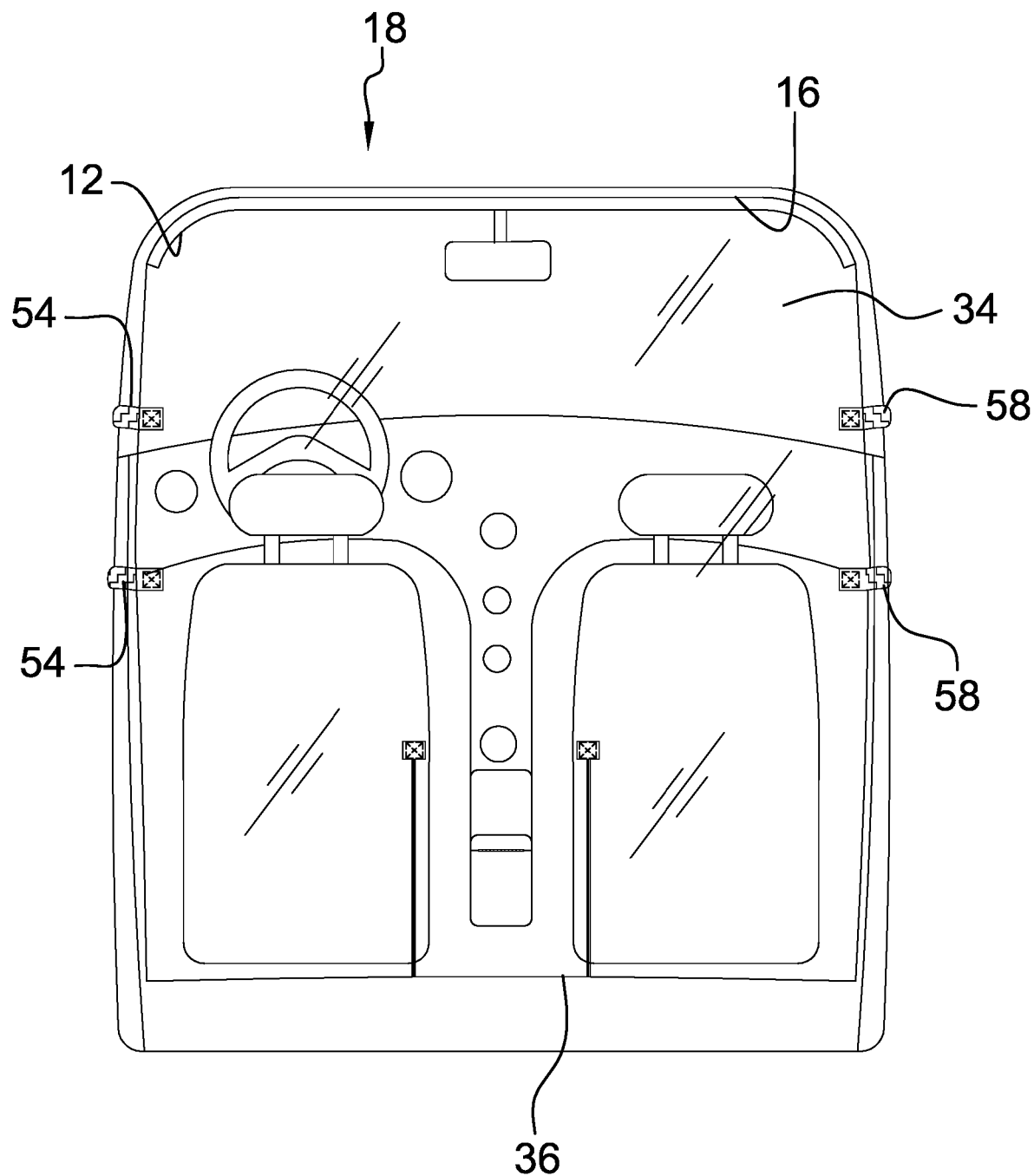
FIG. 3 is an interior in-use view of an embodiment of the disclosure.
Figure 4:
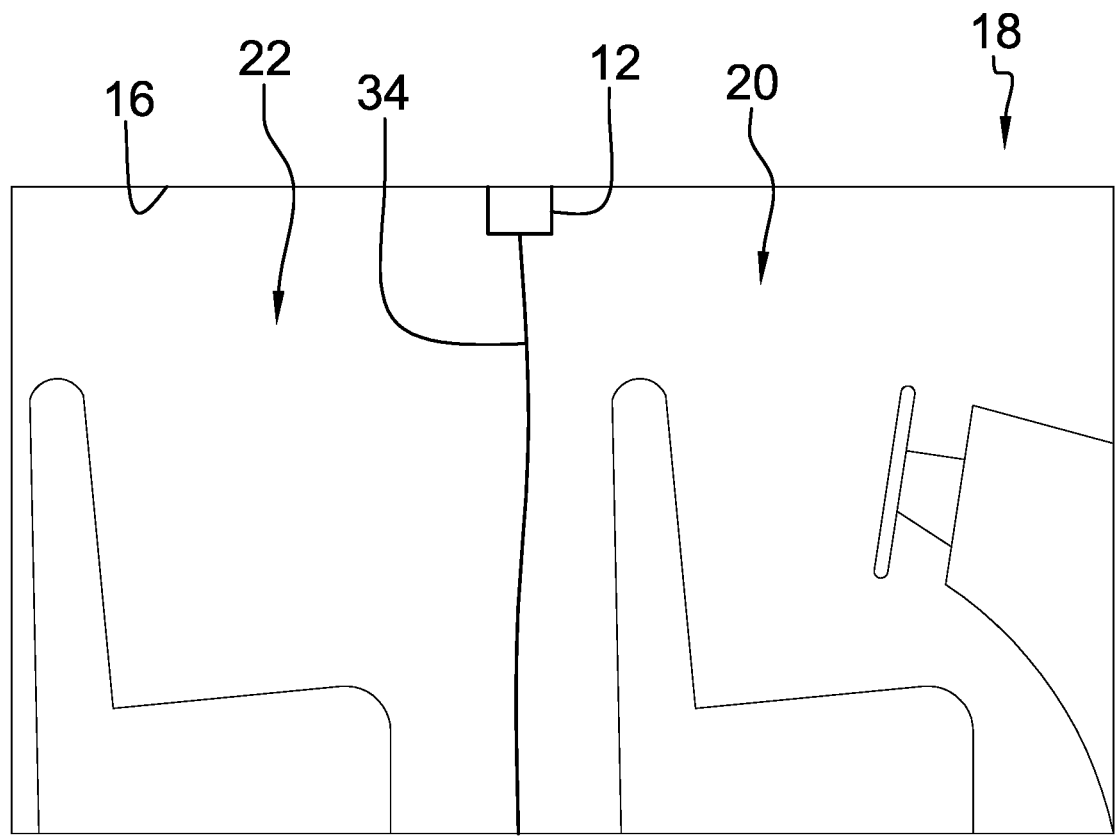
FIG. 4 is a side perspective in-use view of an embodiment of the disclosure.

With reference now to the drawings, and in particular to FIGS. 1 through 4 thereof, a new divider device embodying the principles and concepts of an embodiment of the disclosure and generally designated by the reference numeral 10 will be described.

As best illustrated in FIGS. 1 through 4, the vehicular divider assembly 10 generally comprises a member 12 that has a plurality of bends 14 each being strategically positioned along the member 12. In this way the member 12 can conform to a ceiling 16 of a vehicle cabin 18. The vehicle may be a passenger vehicle, such as a sedan or the like, and the vehicle cabin 18 may have a forward compartment 20 and a rear compartment 22. The member 12 has a first end 24, a second end 26 and an outer surface 28 extending therebetween, and the member 12 is elongated between the first end 24 and the second end 26. Each of the bends 14 is spaced from a respective one of the first end 24 and the second end 26 such that the member 12 has a cradle shape. In this way a top side 30 of the outer surface 28 of the member 12 can abut the ceiling 16 of the vehicle cabin 18 having the member 12 extending laterally across the ceiling 16 and having a lower side 32 of the outer surface 28 of the member 12 being exposed. The member 12 may be structured to conform to the ceiling 16 of a variety of makes and models of vehicles.

A divider 34 is comprised of a flexible material such that the divider 34 can be positioned within a vehicle cabin 18 having the divider 34 extending between the forward compartment 20 of the vehicle cabin 18 and the rear compartment 22 of the vehicle cabin 18. The divider 34 is comprised of a fluid impermeable material to inhibit the transfer of microbes between the forward compartment 20 and the rear compartment 22. Additionally, the divider 34 is comprised of a translucent material to facilitate occupants of the vehicle cabin 18 to see through the divider 34. In this way the divider 34 would be appropriate for use in a personal vehicle that is also operated as a vehicle for hire, such as is common with Uber or Lyft. A flap 36 is integrated into the divider 34 and the flap 36 is positionable in an open position to facilitate air to move between the forward compartment 20 and the rear compartment 22 of the vehicle cabin 18. In this way the flap 36 can be aligned with air vents of the vehicle air conditioning system, for example, that are directed into the rear compartment 22 of the vehicle cabin 18.

The divider 34 has a first surface 38, a second surface 40 and a perimeter edge 42 extending therebetween, and the perimeter edge 42 has a top side 44, a bottom side 46, a first lateral side 48 and a second lateral side 50. The top side 44 is integrated into the lower side of the outer surface 28 of the member 12, and the top side 44 extends between the first end 24 and the second end 26 of the member 12. The bottom side 46 has a pair of cuts 52 each extending toward the top side 44, and the cuts 52 are spaced apart from each other to define the flap 36 between each of the cuts 52. Each of the cuts 52 extends along a line that is oriented perpendicular to the bottom side 46. Additionally, the flap 36 is centrally positioned between the first lateral side 48 and the second lateral side 50 of the perimeter edge 42. The divider 34 may be manufactured in a variety of dimensions to accommodate a variety of makes and models of vehicles.

A pair of first mating members 54 is each coupled to and extends away from the divider 34. Each of the first mating members 54 can be secured to structural features of the vehicle cabin 18. In this way the divider 34 can be retained in a preferred orientation in the vehicle cabin 18. Each of the first mating members 54 extends away from the first lateral side 48 of the perimeter edge 42 of the divider 34, and each of the first mating members 54 has a distal end 56 with respect to the first lateral side 48. Each of the first mating members 54 is stitched to the first surface 38 of the divider 34. The first mating members 54 are spaced apart from each other and are distributed between the top side 44 and the bottom side 46 of the perimeter edge 42 of the divider 34. Additionally, each of the first mating members 54 may be comprised of a resiliently stretchable material such as elastic or the like.

A pair of second mating members 58 is each coupled to and extends away from the divider 34. Each of the second mating members 58 can be secured to structural features of the vehicle cabin 18. In this way the divider 34 can be retained in the preferred orientation in the vehicle cabin 18. Each of the second mating members 58 extends away from the second lateral side 50 of the perimeter edge 42 of the divider 34, and each of the second mating members 58 has a distal end 60 with respect to the second lateral side 50. Each of the second mating members 58 is stitched to the first surface 38 of the divider 34. Additionally, the second mating members 58 are spaced apart from each other and are distributed between the top side 44 and the bottom side 46 of the perimeter edge 42 of the divider 34. Each of the second mating members 58 may be comprised of a resiliently stretchable material such as elastic or the like.

A pair of patches 62 is provided and each of the patches 62 is stitched to the first surface 38 of the divider 34. Each of the patches 62 is aligned with a terminal end 64 of a respective one of the cuts 52 defining the flap 36. Moreover, each of the patches 62 is comprised of a rip resistant material, including but not being limited to, canvas or woven nylon. In this way each of the patches 62 inhibits the respective cut 52 from ripping further when the flap 36 is manipulated.

A pair of first mating units 66 is provided and each of the first mating units 66 is coupled to the divider 34. Each of the first mating units 66 is oriented to extend along opposite sides of the flap 36 from each other. Moreover, each of the first mating units 66 is aligned with a respective one of the cuts 52 in the divider 34, and each of the first mating units 66 is coextensive with the respective cut 52. Each of the first mating units 66 may comprise a flexible magnetic strip.

A pair of second mating units 68 is provided and each of the second mating units 68 is coupled to the flap 36. Each of the second mating units 68 is aligned with opposite sides of the flap 36 from each other. Additionally, each of second mating units 68 is releasably matable to a respective one of the first mating units 66 when the flap 36 is positioned in a closed position. In this way the flap 36 can be releasably retained in the closed position. Each of the second mating members 58 may comprise a flexible magnetic strip.

In use, the divider 34 is positioned in the vehicle cabin 18 in a preferred orientation, generally to sequester the forward compartment 20 from the rear compartment 22. The divider 34 is positioned such that the member 12 abuts the ceiling 16 of the vehicle cabin 18. Each of the first mating members 54 and each of the second mating members 58 is secured to structural features of the vehicle cabin 18 to retain the divider 34 in the preferred orientation. In this way the divider 34 inhibits the airborne transmission of infectious diseases between a driver of the vehicle and a passenger sitting in the rear compartment 22. Moreover, the divider 34 can be installed and removed without requiring modifications to the vehicle cabin 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicular divider assembly for sequestering a forward compartment of a vehicle cabin from a rear compartment of the vehicle cabin, said assembly comprising:
 a member having a plurality of bends each being positioned along said member wherein said member is configured to conform to a ceiling of the vehicle cabin;
 a divider being coupled to said member wherein said divider is configured to be positioned within the vehicle cabin having said divider extending between the forward compartment of the vehicle cabin and the rear compartment of the vehicle cabin, said divider being comprised of a fluid impermeable material wherein said divider is configured to inhibit the transfer of microbes between the forward compartment and the rear compartment, said divider being comprised of a translucent material wherein said divider is configured to facilitate occupants of the vehicle cabin to see through said divider, said divider having a flap being integrated therein, said flap being positionable in an open position wherein said flap is configured to facilitate air to move between the forward compartment and the rear compartment of the vehicle cabin;

a pair of first mating members, each of said first mating members being coupled to and extending away from said divider wherein each of said first mating members is configured to be secured to structural features of the vehicle cabin; and a pair of second mating members, each of said second mating members being coupled to and extending away from said divider wherein each of said second mating members is configured to be secured to structural features of the vehicle cabin;

wherein said member has a first end, a second end and an outer surface extending therebetween, said member being elongated between said first end and said second end, each of said bends being spaced from a respective one of said first end and said second end such that said member has a cradle shape wherein a top side of said outer surface of said member is configured to abut the ceiling of the vehicle cabin having said member extending laterally across the ceiling and having a lower side of said outer surface of said member being exposed;

wherein said divider has a first surface, a second surface and a perimeter edge extending therebetween, said perimeter edge having a top side, a bottom side, a first lateral side and a second lateral side, said top side being integrated into said lower side of said outer surface of said member, said top side extending between said first end and said second end of said member;

wherein said bottom side has a pair of cuts each extending toward said top side, said cuts being spaced apart from each other to define said flap between each of said cuts, each of said cuts extending along a line being oriented perpendicular to said bottom side, said flap being centrally positioned between said first lateral side and said second lateral side of said perimeter edge; and a pair of patches, each of said patches being stitched to said first surface of said divider, each of said patches being aligned with a terminal end of a respective one of said cuts defining said flap, each of said patches being comprised of a rip resistant material thereby facilitating each of said patches to inhibit said respective cut from ripping further when said flap is manipulated.

2. The assembly according to claim 1, wherein each of said first mating members extends away from said first lateral side of said perimeter edge of said divider, each of said first mating members having a distal end with respect to said first lateral side, each of said first mating members being stitched to said first surface of said divider, said first mating members being spaced apart from each other and being distributed between said top side and said bottom side of said perimeter edge of said divider.

3. The assembly according to claim 1, wherein each of said second mating members extends away from said second lateral side of said perimeter edge of said divider, each of said second mating members having a distal end with respect to said second lateral side, each of said second mating members being stitched to said first surface of said divider, said second mating members being spaced apart from each other and being distributed between said top side and said bottom side of said perimeter edge of said divider.

4. The assembly according to claim 1, further comprising a pair of first mating units, each of said first mating units being coupled to said divider, each of said first mating units being oriented to extend along opposite sides of said flap from each other, each of said first mating units being aligned with a respective one of said cuts in said divider, each of said first mating units being coextensive with said respective cut.

5. A vehicular divider assembly for sequestering a forward compartment of a vehicle cabin from a rear compartment of the vehicle cabin, said assembly comprising:

a member having a plurality of bends each being positioned along said member wherein said member is configured to conform to a ceiling of the vehicle cabin;

a divider being coupled to said member wherein said divider is configured to be positioned within the vehicle cabin having said divider extending between the forward compartment of the vehicle cabin and the rear compartment of the vehicle cabin, said divider being comprised of a fluid impermeable material wherein said divider is configured to inhibit the transfer of microbes between the forward compartment and the rear compartment, said divider being comprised of a translucent material wherein said divider is configured to facilitate occupants of the vehicle cabin to see through said divider, said divider having a flap being integrated therein, said flap being positionable in an open position wherein said flap is configured to facilitate air to move between the forward compartment and the rear compartment of the vehicle cabin;

a pair of first mating members, each of said first mating members being coupled to and extending away from said divider wherein each of said first mating members is configured to be secured to structural features of the vehicle cabin;

a pair of second mating members, each of said second mating members being coupled to and extending away from said divider wherein each of said second mating members is configured to be secured to structural features of the vehicle cabin;

wherein said member has a first end, a second end and an outer surface extending therebetween, said member being elongated between said first end and said second end, each of said bends being spaced from a respective one of said first end and said second end such that said member has a cradle shape wherein a top side of said outer surface of said member is configured to abut the ceiling of the vehicle cabin having said member extending laterally across the ceiling and having a lower side of said outer surface of said member being exposed;

wherein said divider has a first surface, a second surface and a perimeter edge extending therebetween, said perimeter edge having a top side, a bottom side, a first lateral side and a second lateral side, said top side being integrated into said tower side of said outer surface of said member, said top side extending between said first end and said second end of said member;

wherein said bottom side has a pair of cuts each extending toward said top side, said cuts being spaced apart from each other to define said flap between each of said cuts, each of said cuts extending along a line being oriented perpendicular to said bottom side, said flap being centrally positioned between said first lateral side and said second lateral side of said perimeter edge;

a pair of first mating units, each of said first mating units being coupled to said divider, each of said first mating units being oriented to extend along opposite sides of said flap from each other, each of said first mating units being aligned with a respective one of said cuts in said divider, each of said first mating units being coextensive with said respective cut; and a pair of second mating units, each of said second mating units being coupled to said flap, each of said second mating units being aligned with opposite sides of said flap from each other, each of said second mating units being releasably matable to a respective one of said first mating units when said flap is positioned in a closed position for retaining said flap in said closed position.

6. A vehicular divider assembly for sequestering a forward compartment of a vehicle cabin from a rear compartment of the vehicle cabin, said assembly comprising:

a member having a plurality of bends each being positioned along said member wherein said member is configured to conform to a ceiling of the vehicle cabin, said member having a first end, a second end and an outer surface extending therebetween, said member being elongated between said first end and said second end, each of said bends being spaced from a respective one of said first end and said second end such that said member has a cradle shape wherein a top side of said outer surface of said member is configured to abut the ceiling of the vehicle cabin having said member extending laterally across the ceiling and having a lower side of said outer surface of said member being exposed;

a divider being coupled to said member wherein said divider is configured to be positioned within the vehicle cabin having said divider extending between the forward compartment of the vehicle cabin and the rear compartment of the vehicle cabin, said divider being comprised of a fluid impermeable material wherein said divider is configured to inhibit the transfer of microbes between the forward compartment and the rear compartment, said divider being comprised of a translucent material wherein said divider is configured to facilitate occupants of the vehicle cabin to see through said divider, said divider having a flap being integrated therein, said flap being positionable in an open position wherein said flap is configured to facilitate air to move between the forward compartment and the rear compartment of the vehicle cabin, said divider having a first surface, a second surface and a perimeter edge extending therebetween, said perimeter edge having a top side, a bottom side, a first lateral side and a second lateral side, said top side being integrated into said lower side of said outer surface of said member, said top side extending between said first end and said second end of said member, said bottom side having a pair of cuts each extending toward said top side, said cuts being spaced apart from each other to define said flap between each of said cuts, each of said cuts extending along a line being oriented perpendicular to said bottom side, said flap being centrally positioned between said first lateral side and said second lateral side of said perimeter edge;

a pair of first mating members, each of said first mating members being coupled to and extending away from said divider wherein each of said first mating members is configured to be secured to structural features of the vehicle cabin, each of said first mating members extending away from said first lateral side of said perimeter edge of said divider, each of said first mating members having a distal end with respect to said first lateral side, each of said first mating members being stitched to said first surface of said divider, said first mating members being spaced apart from each other and being distributed between said top side and said bottom side of said perimeter edge of said divider;

a pair of second mating members, each of said second mating members being coupled to and extending away from said divider wherein each of said second mating members is configured to be secured to structural features of the vehicle cabin, each of said second mating members extending away from said second lateral side of said perimeter edge of said divider, each of said second mating members having a distal end with respect to said second lateral side, each of said second mating members being stitched to said first surface of said divider, said second mating members being spaced apart from each other and being distributed between said top side and said bottom side of said perimeter edge of said divider;

a pair of patches, each of said patches being stitched to said first surface of said divider, each of said patches being aligned with a terminal end of a respective one of said cuts defining said flap, each of said patches being comprised of a rip resistant material thereby facilitating each of said patches to inhibit said respective cut from ripping further when said flap is manipulated;

a pair of first mating units, each of said first mating units being coupled to said divider, each of said first mating units being oriented to extend along opposite sides of said flap from each other, each of said first mating units being aligned with a respective one of said cuts in said divider, each of said first mating units being coextensive with said respective cut; and a pair of second mating units, each of said second mating units being coupled to said flap, each of said second mating units being aligned with opposite sides of said flap from each other, each of said second mating units being releasably matable to a respective one of said first mating units when said flap is positioned in a closed position for retaining said flap in said closed position.

* * * * *